United States Patent Office 3,623,359
Patented Nov. 30, 1971

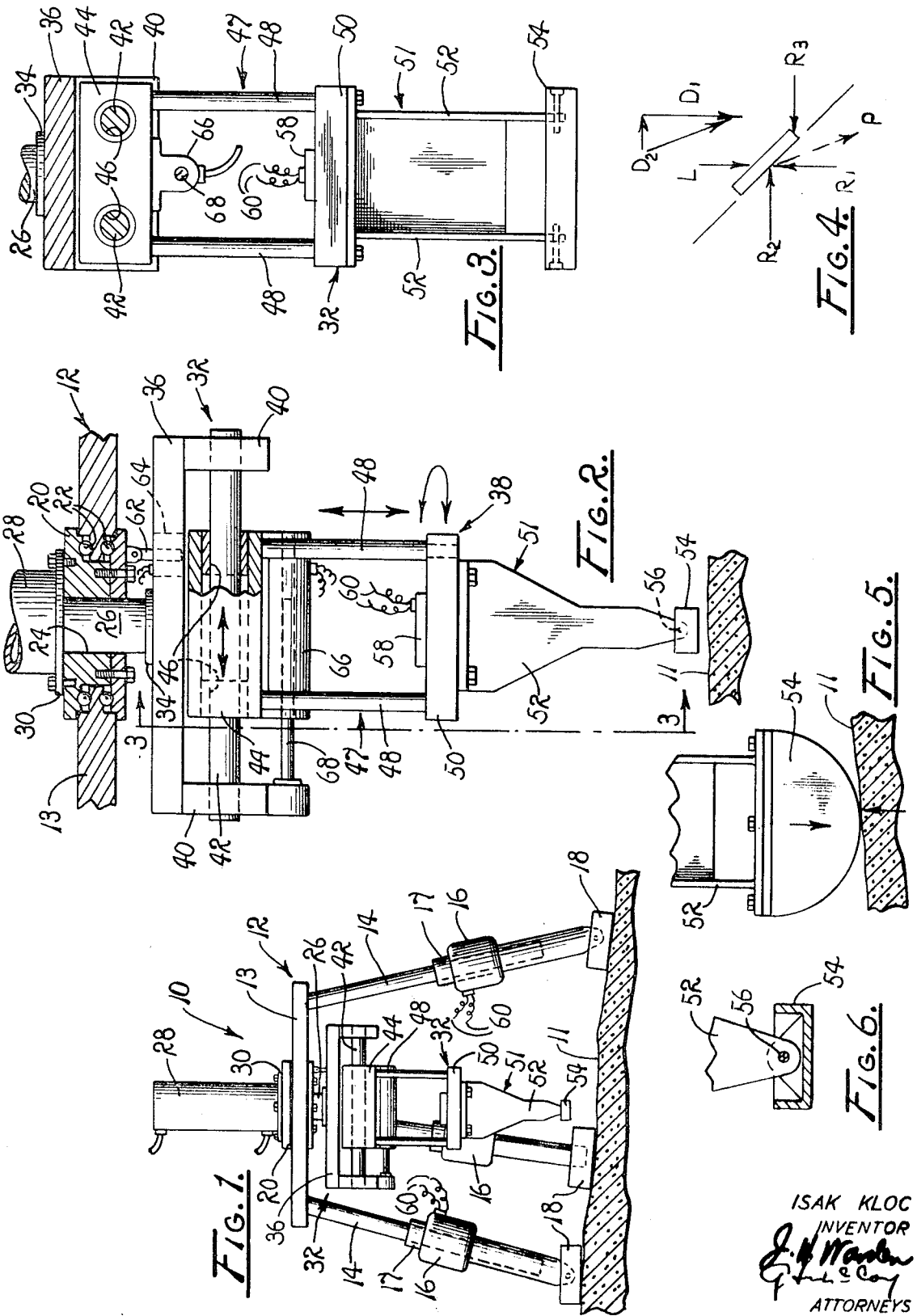

3,623,359
PENETROMETER
Thomas O. Paine, Administrator of the National Aeronautics and Space Administration, with respect to an invention of Isak Kloc, Pasadena, Calif.
Filed Jan. 19, 1970, Ser. No. 3,654
Int. Cl. G01n 3/42
U.S. Cl. 73—84                                                                 7 Claims

ABSTRACT OF THE DISCLOSURE

A penetrometer particularly suited for use in empirically determining the load-bearing characteristics of a load-bearing surface inclined with respect to a horizontal plane, characterized by a penetrometer mount rotatably supporting a vertically driven probe, a feature of the invention being the provision means supporting the probe for simultaneous displacement in both vertical and lateral directions, whereby the extent of resulting lateral displacement imposed on the probe, as vertical displacement operatively is imparted thereto, can be detected and measured for purposes of accurately indicating the true load-bearing characteristics of the surface, regardless of its angle of inclination.

ORIGIN OF INVENTION

The invention described herein was made in the performance of work under a NASA contract and is subject to the provisions of Section 305 of the National Aeronautics and Space Act of 1958, Public Law 85-568 (72 Stat. 435: 42 U.S.C. 2457).

BACKGROUND OF THE INVENTION

(1) Field of the invention

The invention relates to instruments adapted for use in determining the load-bearing characteristics of a surface and more specifically to an instrument particularly suited for use in empirically determining the load-bearing characteristics of inclined surfaces of remotely located bodies of soil and the like.

(2) Description of the prior art

The prior art includes numerous devices which forceably are inserted into bodies of soil for determining its load-bearing characteristics. Where access to a given body of soil can readily be acquired, techniques employed in examining the soil are relatively simple. For example, where the body of soil being examined has a surface substantially parallel to a horizontal plane, a penetrometer probe under a given load vertically is forced into the soil. The extent of displacement imparted to the probe, over a given period of time, provides an indication of the soil's capability for supporting vertically applied loads. In some instances the force required in achieving a given penetration is employed in making the determination, while in other instances the extent of penetration achieved by a probe of a given dimension acting under a given load is employed in determining the load-bearing characteristics of the soil. Where the surface of the body of soil is tilted or inclined relative to a horizontal plane, it is common practice to excavate a portion of the surface to establish a step-like, relatively flat horizontal area whereupon the load-bearing capability of the soil is determined by their vertically penetrating the soil's surface. Where the type of soil being examined is known, the load-bearing characteristics of its surface, at any given angle of inclination accurately can be determined through simple computations.

In instances where access to the surface being examined is restricted, such as in those instances where the surface to be examined is located in celestial space, for example, difficulty is encountered in determining its load-bearing characteristics. This difficulty is compounded in instances where a vertically directed load is to be applied to an inclined surface, due to a soil's inherent lack of ability to withstand substantial lateral loading. Devices heretofore employed in determining the load-bearing characteristics of the surface of a body of soil normally are designed for uni-directional displacement and restrained against lateral displacement. Consequently, it has heretofore been found quite difficult to obtain a true indication on the load-bearing characteristics of remotely located, inclined surfaces, since the lateral restraint imposed on the probes employed inherently tends to introduce error of unknown magnitudes.

Consequently, there currently exists a need for a simplified penetrometer for use in empirically determining the load-bearing characteristics of inclined surfaces of remotely located and substantially inaccessible bodies of soil.

OBJECTS AND SUMMARY OF THE INVENTION

It is therefore an object of the instant invention to provide a simplified penetrometer for use in empirically determining the load-bearing characteristics of surfaces of selected bodies.

Another object is to provide an improved penetrometer for determining the vertical load-bearing characteristics of inclined surfaces of remotely located bodies of soil.

Another object is to provide a penetrometer adapted for use in determining the load-bearing characteristics of surface soil of remotely located and substantially inaccessible, load-supporting, celestial bodies.

Another object is to provide a penetrometer probe including a terminal pad adapted to be laterally displaced as it is vertically and forceably inserted into the surface of a body of soil, whereby the extent of vertical and lateral displacement imposed on the pad may be detected and measured for use in determining the load-bearing characteristics of the soil adjacent to the surface of the body.

These together with other objects and advantages are attained through an improved penetrometer having a displaceable probe positionable over selected surfaces to be inserted thereinto, in response to a vertically applied load, while lateral displacement of the probe simultaneously is accommodated whereby both vertical and lateral displacement of the probe can be detected and measured for providing empirically derived intelligence indicative of the load-bearing characteristics of the surface, regardless of its type and angle of inclination.

BRIEF DESCRIPTION OF THE DRAWING

FIG. 1 is a side elevation of the penetrometer embodying the principles of the present invention, illustrating an operative disposition of the probe employed thereby.

FIG. 2 is a partial sectioned side elevation, on somewhat of an enlarged scale, of the probe illustrated in FIG. 1.

FIG. 3 is an end elevation of the probe.

FIG. 4 is an exaggerated force diagram depicting forces which operatively are applied to the pad of the probe of FIGS. 1 through 3.

FIGS. 5 and 6 are alternate forms of a pad which may be employed by the probe of FIGS. 1 through 3.

DESCRIPTION OF THE PREFERRED EMBODIMENT

Referring now to the drawings wherein like reference characters designate like or corresponding parts throughout the several views, there is shown in FIG. 1, a penetrometer 10 embodying the principles of the present invention. The penetrometer pictorially is illustrated in an operative disposition relative to an inclined surface 11 of a body of soil, the load-bearing characteristics of which are to be determined.

The penetrometer 10 includes a supporting mount 12 including a horizontally extended base 13 supported above the surface 11 by a plurality of axially extendible telescoping legs 14. The lengths of the legs 14 independently are varied through suitable extension motors 16 for purposes of positioning the penetrometer 10 in an operative disposition wherein the base 13 is caused to assume a horizontal disposition. It is to be understood that while the mount 12 is deemed adequate for its intended purpose, any suitable mount may be employed in supporting the penetrometer in predetermined dispositions wherein the base 13 is extended in a horizontal plane.

As illustrated, the motors 16 independently are coupled with the legs 14 through any suitable means such as a worm 17 for example, in order that an independent extention and retraction of the legs be achieved for thus causing the base 13 to assume a selected orientation relative to a vertical plane. As a practical matter, the distal end of each of the legs 14 is provided with a support pad 18 which inhibits penetration of the legs into the surface being examined.

The penetrometer 10 also includes a rotatable base plate 20 supported for rotation about a vertical axis by suitable bearing structure 22, FIG. 2, which permits the plate 20 to be freely rotated in the plane of a base 13. The plate 20, in turn, is provided with an axial bore 24 through which extends an actuator shaft 26 operatively supported by a linear actuator 28 fixedly mounted on the plate 20. The actuator 28 is seated on the plate 20 and is rigidly coupled therewith through a suitable mounting collar 30 so that the actuator and the plates are integrated for thereby accommodating rotation of the actuator as a rate of rotation is imparted thereto.

Since the actuator 28 forms no specific part of the instant invention, and may be varied as desired, a detailed description of the actuator is omitted. However, as a practical matter a pneumatic or gas-operated actuator can be employed in displacing the shaft, so long as an output load of determinable value is delivered by the actuator over a predetermined period.

From the distal end of the shaft 26 there is suspended a penetrometer probe, generally designated 32. A coupling collar 34 is threadingly or otherwise suitably secured to the distal end of the shaft 26 while being welded or otherwise affixed to a suitable probe supporting bracket 36. The bracket 36, in turn, includes a laterally extended base 38 from which depends a pair of spaced, parallel support plates 40. The plates 40 serve to support a pair of parallel bearing rails 42 extended between the plates 40 in a plane parallel to the plane of the base 13. The rails 42, in turn, slidably support a bearing block 44 having formed therein a pair of spaced openings 46. The openings 46 are of a cylindrical configuration and are so surfaced as to provide bearing surfaces for receiving the bearing rails 42 in order that a sliding displacement of the block relative to the rails readily can be achieved.

From the bearing block 44 there is suspended a force transmitting structure 47 of any suitable design. As illustrated, the force transmitting structure includes vertical support members 48 having affixed thereto a laterally extended base 50. From the base 50 there depends a pad support 51, including a pair of spaced, parallel pad support legs 52, FIG. 3, to the distal end of which there is coupled a soil penetrating pad 54. The pad 54 is coupled to the legs of the support 51 through any suitable means, including a suitable pivot pin 56 so that as the support 51 is extended toward the soil, the penetrating pad 54 will be forced into the adjacent surface 11.

In practice, the pad 54 is provided with a predetermined surface area in order that the total resistance to penetration offered by the surface 11 be rendered intelligible. Of course, it should readily be apparent that the surface area of the pad 54 may be varied as desired for achieving selected penetration. While a pad having trapezoidal cross-sectional configuration, as illustrated in FIGS. 1 and 2, is preferred, a cylindrical surface such as that illustrated in FIG. 5 readily may be utilized. Furthermore, a pad having a rectangular cross-section, such as illustrated in FIG. 6, also can be employed. In any event, it should be appreciated that the specific configuration and dimension of the pad 54 is dictated by the specific operative environment and is employed to provide a working surface which, in operation, penetrates the surface of the soil being examined.

In practice, it is preferred that the pivot pin 56 employed in coupling the distal end of the legs 52 with the pad 54 accommodate oscillation of the pad 54 in order that the planar surface of the pad be permitted to assume a face-to-face engagement with the surface of the soil, regardless of its angle of inclination, as best illustrated in FIG. 4.

Also, and as a practical matter, the penetrometer 10 is provided with a leveling device 58, such as a suitably arranged mercury switch mounted on the base 50 and electrically connected with the motors 16 so that the angular disposition of the probe 32, relative to a vertical axis, continuously be monitored and its deviation be corrected by delivering a plurality of output signals to the motors 16 through electrical leads 60. Since various types of suitable leveling devices currently are available, a detailed description of the device 58 is omitted. However, it is to be understood that the output signals derived from the leveling device 58 are employed in driving the motors 16 for orienting the base 13 in a manner such that the base plate 20, as well as the base 50, continuously are extended in horizontal planes, whereby the pad support 51 of the probe 32 is vertically advanced toward the surface 11, regardless of the roughened condition and inclination of the surface.

In order that vertical displacement of the probe 32, relative to the base 13, be detected and measured, a strain gauge 62 is mounted on the base plate 20 and is coupled with the bracket 36 through a suitable connecting rod 64. The strain gauge 62 is of any suitable design which currently is available for use in detecting mutual displacement imparted to adjacent bodies. For example, an electrical potentiometer or a linear variable differential transformer can be employed for this purpose.

Due to the fact that the block 44 is slidably supported by the rails 42, the probe 32 is afforded lateral displacement in the event a laterally directed force is applied thereto. As best illustrated in FIG. 4, as a load L is applied to the pad 54, vertical displacement $D_1$ occurs and the pad 54 encounters the resistance of reactant forces, designated $R_1$, $R_2$ and $R_3$. The algebraic summation of these forces tend to impose lateral displacement $D_2$ on the pad 54 as the pad moves through distance $D_1$. Therefore, a second strain gauge 66 is provided for dictating and measuring the lateral displacement. This strain gauge is quite similar to the strain gauge 62 and is mounted on the force transmitting structure 47 and interconnected with the supporting bracket 36 through a suitable connecting rod 68.

Consequently, it should be apparent that the extent of lateral displacement $D_2$ imparted to the bearing blocks 44 and the probe 32 is detected and measured as the extent of vertical displacement imparted to the probe is detected and measured. The output thus acquired is delivered through suitable circuitry, not shown, and utilized in determining the load-bearing characteristics of the surface. As a practical matter, the strain gauges 62 and 66 are interconnected with a telemetering system, not shown.

OPERATION

It is believed that in view of the foregoing description, the operation of the device will be readily understood and it will be briefly reviewed at this point. The penetrometer 10, assembled in a manner hereinbefore described, is in operation positioned above the surface 11 of a given body of soil having a sloping surface. The leveling device 58 detects inclination of the mount 12, which may approximate the inclination of the surface, and delivers suitable electrical signals to the motors 16 for effecting an extension or retraction of the legs 14 in a manner such that the base plate 20 and the probe 32 are caused to assume a vertical disposition relative to a horizontal plane. Once the probe 32 is appropriately positioned, a suitable electrical signal is delivered from a given source, not shown, to the actuator 28, whereupon the shaft 26 is extended for forcing the probe 32, and its associated pad 54, into engagement with the surface 11 being examined. In response to the pad 50 being brought into engagement with the surface 11 of the body of soil it is caused to pivot about the pivotal coupling 56 in order that its planar surface be brought into a face-to-face engagement with the surface, as illustrated in FIG. 4. Once engagement has been established between the surface of the pad 54 and the adjacent surface 11 of the body of soil, the shaft 26 is extended through an application of predetermined force, designated L, FIG. 4, for thereby causing the pad 54 to penetrate the surface 11. Due to the fact that the probe 32 is supported by the rotatable base plate 20, rotation of the probe 32 is accommodated. Consequently, as the pad 54 engages a sloping surface, the plate and probe tend to rotate in an appropriate direction for causing the rails 42 to extend in the direction of the slope whereby lateral displacement of the bearing blocks 44 is accommodated.

As the pad penetrates the surface 11, the reaction forces $R_1$, $R_2$ and $R_3$, FIG. 4, are encountered and act thereagainst so that as the pad 54 is advanced through the distance $D_1$, the algebraic sum of forces $R_2$ and $R_3$ cause the pad 54 to be displaced through a lateral distance designated $D_2$. Consequently, the pad 54 is directed along a path designated P as it is caused to penetrate the surface. The displacements $D_1$ and $D_2$ are detected and measured by the strain gauges 62 and 66, respectively. Hence, for any given load L applied to the shaft 26, the load-bearing capability of the soil, as represented by arrows $R_1$, $R_2$ and $R_3$, can be determined and identified in units of force per units of area. Furthermore, where desired, the output acquired from the strain gauges, under increasing loads, can be utilized determining penetration achieved under given loading rates. Therefore, it should be apparent that through the use of the penetrometer 10 the load-bearing characteristics of the surface 11 of a given body of soil being examined readily may be empirically determined.

In view of the foregoing, it is to be understood that the present invention provides a simplified penetrometer having particular utility in examining and empirically determining the vertical load-bearing characteristics of an inclined surface of a body of soil, without requiring a designation of the soil type, its moisture content, or its state of compaction.

Although the invention has been herein shown and described in what is conceived to be the most practical and preferred embodiment, it is recognized that departures may be made therefrom within the scope of the invention. which is not to be limited to the illustrative details disclosed.

What is claimed is:
1. A penetrometer including:
    (A) a penetrometer pad;
    (B) means supporting said pad for simultaneous linear displacement along a pair of predetermined angularly related paths;
    (C) means connected with said pad for imparting linear displacement imparted to said pad along said
    (D) means connected with said pad for detecting linear displacement imparted to said pad along said predetermined angularly related paths.
2. A penetrometer for use in determining load-bearing characteristics of an inclined surface comprising:
    (A) means including a mount for positioning the penetrometer above said inclined surface;
    (B) means including a downwardly extended shaft supported by said mount for axial displacement toward said surface;
    (C) a first bracket fixed to the distal end of the shaft and supported for displacement toward said surface;
    (D) a pair of horizontally extended rails suspended from said first bracket;
    (E) a second bracket;
    (F) bearing means slidably supported by said rails for slidably coupling said second bracket with said first bracket whereby lateral displacement of said second bracket is accommodated;
    (G) a penetrometer pad suspended from said second bracket; and
    (H) detector means including a plurality of strain gauges operatively associated with said first and second brackets for detecting vertical and lateral displacement imparted to said pad.
3. The penetrometer of claim 2 wherein said mount includes a horizontally oriented plate supported for rotation about an axis coincident with the longitudinal axis of said shaft, and means for mounting said actuator on said plate.
4. The penetrometer of claim 3 wherein the pad includes a planar surface for engaging said inclined surface and means including a pivotal coupling for coupling said pad to said second bracket.
5 A penetrometer for use in determining load-bearing characteristics of a surface of a body of soil inclined from a horizontal plane:
    (A) a penetrometer mount for supporting the penetrometer above said surface including a plurality of independently and selectively extendible legs;
    (B) a linear actuator supported by said mount including a vertically depending, axially extendible shaft;
    (C) a freely rotatable plate associated with said mount supporting said actuator for rotation about a vertical axis;
    (D) a first bracket coupled with the distal end of said shaft having a pair of bearing rails extended in a plane parallel to said horizontal plane;
    (E) a second bracket slidably suspended from said rails;
    (F) a penetrometer pad suspended from the second bracket for engaging said surface as said shaft is extended; and
    (G) means for selectively energizing said actuator for achieving an extension of said shaft, whereby the pad is caused to engage said surface as said shaft is extended.
6. The penetrometer of claim 5 further comprising a plurality of strain gauges operatively associated with said pad.
7. The penetrometer of claim 6 further comprising a pivotal support coupling said penetrometer pad with said second bracket.

References Cited
UNITED STATES PATENTS 2,182,235  12/1939  Polushkin _____ 73—78
2,607,218  8/1952  Hansen.

RICHARD C. QUEISSER, Primary Examiner

E. J. KOCH, Assistant Examiner

U.S. Cl. X.R.

73—78

UNITED STATES PATENT OFFICE
CERTIFICATE OF CORRECTION

Patent No. 3,623,359            Dated November 30, 1971

Inventor(s) Isak Kloc

It is certified that error appears in the above-identified patent and that said Letters Patent are hereby corrected as shown below:

Column 1, line 67, "their" should read -- there --. Column 6, line 1 cancel "imparted to said pad along said" and insert -- thereto; and --.

Signed and sealed this 1st day of August 1972.

(SEAL)
Attest:

EDWARD M. FLETCHER, JR.      ROBERT GOTTSCHALK
Attesting Officer               Commissioner of Patents